United States Patent
Hill et al.

(12)
(10) Patent No.: US 6,807,987 B2
(45) Date of Patent: Oct. 26, 2004

(54) LOCATION MARKER

(76) Inventors: Steven D. Hill, 29 Eaton St., Battle Creek, MI (US) 49017; Gregory Burrett, 3099 B Dr. South, East LeRoy, MI (US) 49051

( * ) Notice: Subject to any disclaimer, the term of this patent is extended or adjusted under 35 U.S.C. 154(b) by 280 days.

(21) Appl. No.: 09/952,664

(22) Filed: Sep. 12, 2001

(65) Prior Publication Data
US 2003/0047226 A1 Mar. 13, 2003

(51) Int. Cl.[7] .............................................. F16L 55/00
(52) U.S. Cl. ....................................... 138/104; 138/178
(58) Field of Search .............................. 138/104, 178; 248/206.5; 220/230; 403/DIG. 1; 206/818; D21/404; 446/129; 335/303

(56) References Cited

U.S. PATENT DOCUMENTS

| | | | | |
|---|---|---|---|---|
| 2,225,205 A | * | 12/1940 | Brooks ........................ 335/305 |
| 2,665,913 A | * | 1/1954 | Hlavac ........................ 273/239 |
| 2,953,970 A | * | 9/1960 | Maynard ..................... 359/611 |
| 3,367,370 A | * | 2/1968 | Sherlock ..................... 138/104 |
| 4,480,361 A | * | 11/1984 | Morita .......................... 24/303 |
| 4,767,237 A | * | 8/1988 | Cosman et al. .............. 405/157 |
| 5,017,873 A | * | 5/1991 | Rippingale et al. ......... 138/104 |
| 5,031,874 A | * | 7/1991 | Shannon ..................... 248/683 |
| 5,051,034 A | * | 9/1991 | Goodman .................... 138/104 |
| RE34,701 E | * | 8/1994 | Goodman .................... 138/104 |
| 5,571,411 A | * | 11/1996 | Butler et al. ................. 210/223 |
| 5,895,018 A | * | 4/1999 | Rielo ........................ 248/206.5 |
| 6,092,558 A | * | 7/2000 | Maccario .................... 138/104 |
| 6,329,895 B1 | * | 12/2001 | Maurer et al. .............. 335/303 |
| 6,387,485 B1 | * | 5/2002 | Bielek et al. ................ 428/343 |
| 2001/0029989 A1 | * | 10/2001 | Paz .............................. 138/104 |
| 2002/0175251 A1 | * | 11/2002 | Robinson et al. ........ 248/206.5 |

* cited by examiner

*Primary Examiner*—James Hook
(74) *Attorney, Agent, or Firm*—Flynn, Thiel, Boutell & Tanis, P.C.

(57) ABSTRACT

A location marker according to this invention includes a housing that has a top surface and a bottom surface. A pot magnet is secured in the housing. The pot magnet includes a magnet that has a single magnetic pole surface and is positioned in a case component. The pot magnet is positioned in the marker housing so that the magnetic pole surface is in opposition to the bottom surface of the marker housing.

3 Claims, 3 Drawing Sheets

LOCATION MARKER

FIELD OF THE INVENTION

This invention relates generally to a location marker and, more particularly, to a location marker that includes a pot magnet that can be detected easily from an underground position.

BACKGROUND OF THE INVENTION

Underground pipes, such as water, sewage and/or drainage pipes, are often difficult to locate when work needs to be done to them or around them. However, if the work is begun without properly locating these pipes, the original construction expenses can soar. For instance, when a construction crew is preparing to work on a water pipe, or other pipe, that is buried beneath a road, if the pipe is not properly located, or cannot be located at all, the crew might have to guess as to the location of the pipes. An incorrect guess will result in additional portions of the road being broken up, and thus, having to be replaced. This can increase both the time and the amount of money spent on the project. Further, if a property owner cannot adequately locate buried water or sewage pipes when beginning construction, the property owner could face fines and/or replacement costs if the pipe is found inadvertently during digging. These problems are particularly acute when the pipes are non-metallic in nature. Thus, what is needed is a location marker that is inexpensive, reliable and easy to detect, even when positioned underground.

SUMMARY OF THE INVENTION

The objects and purposes of the invention are met by providing a location marker including a marker housing that has a top surface and a bottom surface. A pot magnet is secured in the marker housing. The pot magnet includes a magnet that has a magnetic pole surface and is positioned in a case component. The case component and the pot magnet are positioned in the marker housing so that the magnetic pole surface is in opposition to the bottom surface of the marker housing.

Owing to the structure of this location marker, pipes, such as water pipes, that are buried underground can be easily and reliably located. By affixing the location marker of this invention to such a pipe or orienting it adjacent the pipe, a strong magnetic field is projected upward, that can be detected by a conventional magnet detector. In addition, the location marker of this invention is also suitable as a property line marker. For instance, by placing a series of the location markers underground along the property line, the limits of a parcel of land can be located quickly and easily.

BRIEF DESCRIPTION OF THE DRAWINGS

The above and further features and benefits of this invention will be understood by reference to the following detailed description, as well as by reference to the following drawings in which.

DETAILED DESCRIPTION

Figure 1:
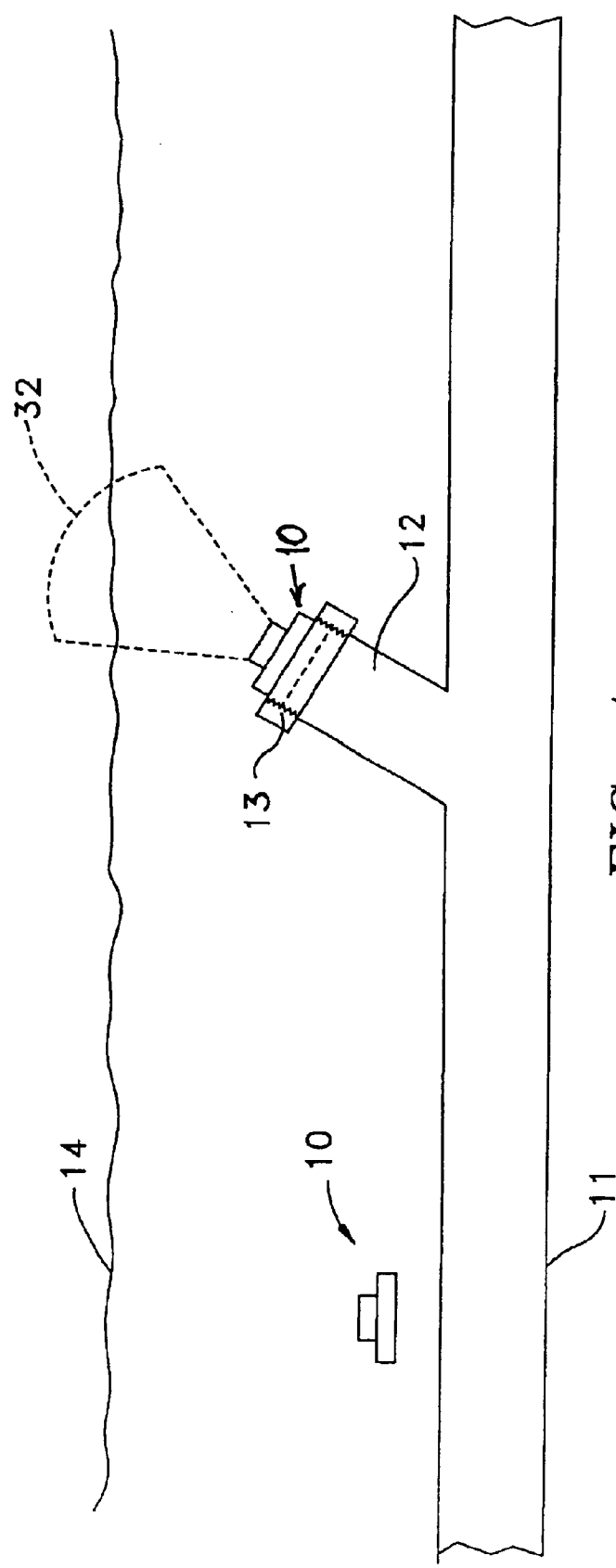
FIG. 1 is a side view of a polyvinyl chloride (PVC) pipe positioned underground and including a location marker according to this invention.

Referring to FIG. 1, there is illustrated a portion an underground pipe 11. The pipe 11 could be a portion of any underground system, such as a water, sewage or drainage system. The pipe 11 has been illustrated as a polyvinyl chloride (PVC) pipe. However, the pipe 11 could instead be composed of any suitable underground pipe material. The pipe 11 is positioned a conventional distance beneath the ground surface 14. Attached to or at least oriented adjacent to and preferably above the pipe 11 are two location markers 10 according to this invention.

Figure 2:
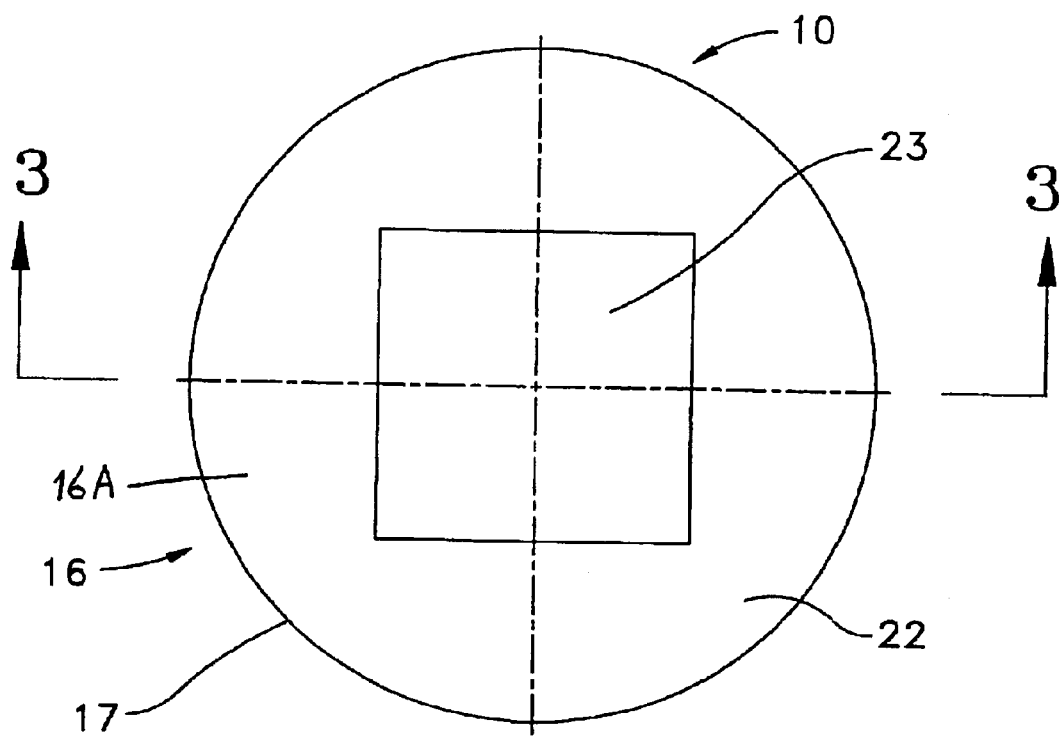
FIG. 2 is top view of the location marker of FIG. 1.
Figure 3:
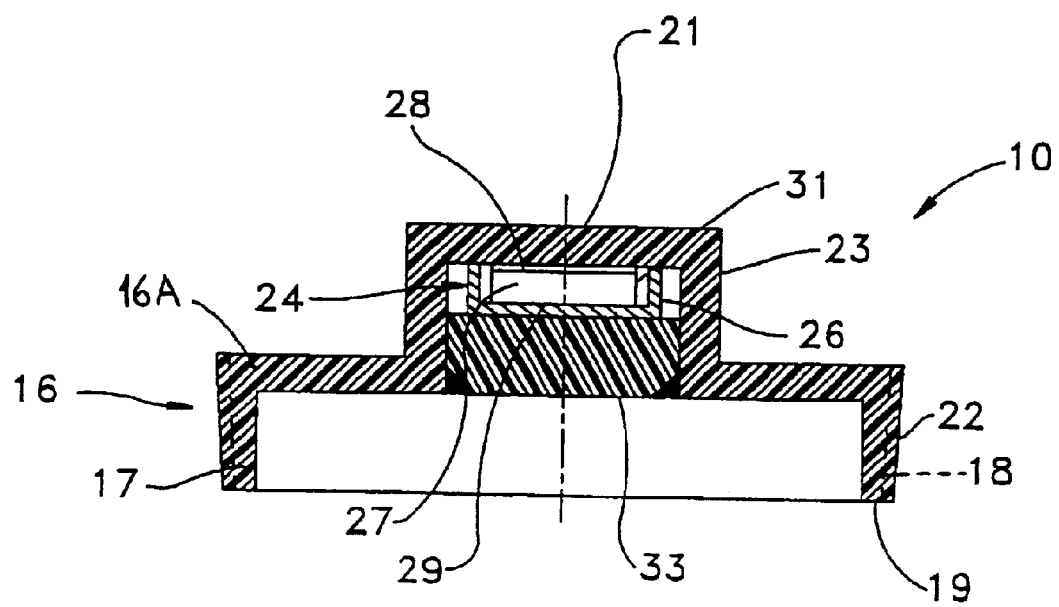
FIG. 3 is a sectional side view of the location marker taken along the section lines III—III of FIG. 2.

Referring in addition to FIGS. 2 and 3, the location marker 10 of this invention includes a marker housing 16. As illustrated, when the pipe 11 is a PVC pipe, the marker housing 16 can be a PVC plug 17 that is attached to the underground pipe 11 in any conventional manner, such as being a cap for the cleanout port 12 (FIG. 1) of the pipe 11. The location marker 10 can be attached to the cleanout port 12 by a set of external threads 18 on the plug 17 being mated with a set of internal threads 13 (FIG. 1) included on an enlarged portion of the cleanout port 12. The plug 17 has a planar plate-like body 16A from one side of which projects an annular skirt 22 and from the opposite side of which projects an elevated and hollow square portion or protuberance 23. The top end of the hollow interior of the protuberance is closed off by an end wall 21. The plate-like body 16A, the annular skirt 22, the protuberance 23 and end wall 21 are of a unitary construction.

Positioned within the square portion 23 of the PVC plug 17 is a pot magnet 24. The pot magnet 24 includes a casing component 26 that is composed of steel or another suitable material. Concentrically positioned within the casing component 26 is a magnet component 27. The magnet component 27 is a circular magnet having a top surface 28, a bottom surface 29 and a side surface 31. The top surface 28 is a magnetic pole surface that can retain its magnetic properties indefinitely. The magnet component 27 is positioned in the casing component 26 so that the only exposed surface of the magnet component 27 is the top pole surface 28. Since the only magnetic surface of the magnet component 27 is the top surface 28, the magnetic field 32 (FIG. 1) of the pot magnet 24 will be directed upward from the top surface 28 in a narrow cone. While the magnetic field 32 for the pot magnet 24 is less penetrating than for that of a simple magnet, it is more powerful on contact. Thus, even when the location marker 10 is buried relatively deep underground, the magnetic field 32 can still be easily detected. However, the strength of the individual pot magnet 24 will determine how far below the ground surface 14 the location marker 10 can be positioned and still located. In other words, the more powerful the pot magnet 24, the deeper the location marker 10 can be located and still detected.

The pot magnet 24 is secured within the square portion 23 of the plug 17 by a spacer or end wall 33. The end wall 33 can be a plastic, preferably PVC, spacer that is welded or otherwise adhesively secured to the plug 17. The pot magnet 24 is oriented within the plug 17 so that the top pole surface 28 of the magnet component 27 is in opposition to the end wall 33 and the bottom surface 19. The end wall 33 should be sufficiently sized and shaped at the periphery relative to the size and shape of the periphery of the hollow interior of the protuberance 23 to facilitate the aforesaid weldment and be positioned to prevent the pot magnet 24 from overturning when the plug 17 is moved around.

To use the location marker 10 of the present invention to mark underground pipes, such as water or drainage pipes, the pot magnet 24 is first positioned in the PVC plug 17, and secured in place by the end wall 33. The PVC plug 17 is then attached to or otherwise oriented adjacent to and preferably above a portion of PVC pipe 11, as illustrated in FIG. 1 which is positioned under the ground surface 14 and attached to an underground water, sewage or drainage, system. The pipe 11 is positioned such that the pole surface 28 of the magnet component 27 faces the ground surface 14, namely upward.

When it is desired to detect the pipe 11, a conventional magnet detector is passed over the area beneath which the pipe 11 is believed to be buried. Since the magnetic field 32 of the pot magnet 24 is directed upward in a narrow cone, when the magnet detector detects the magnetic field 32, the location of the pipe 11 can be reasonably known. Thus, the user can dig down to the pipe 11 and/or the cutout port 12 of the pipe 11, or dig around the pipe 11, with reasonable knowledge of the location of the pipe 11.

Figure 4:
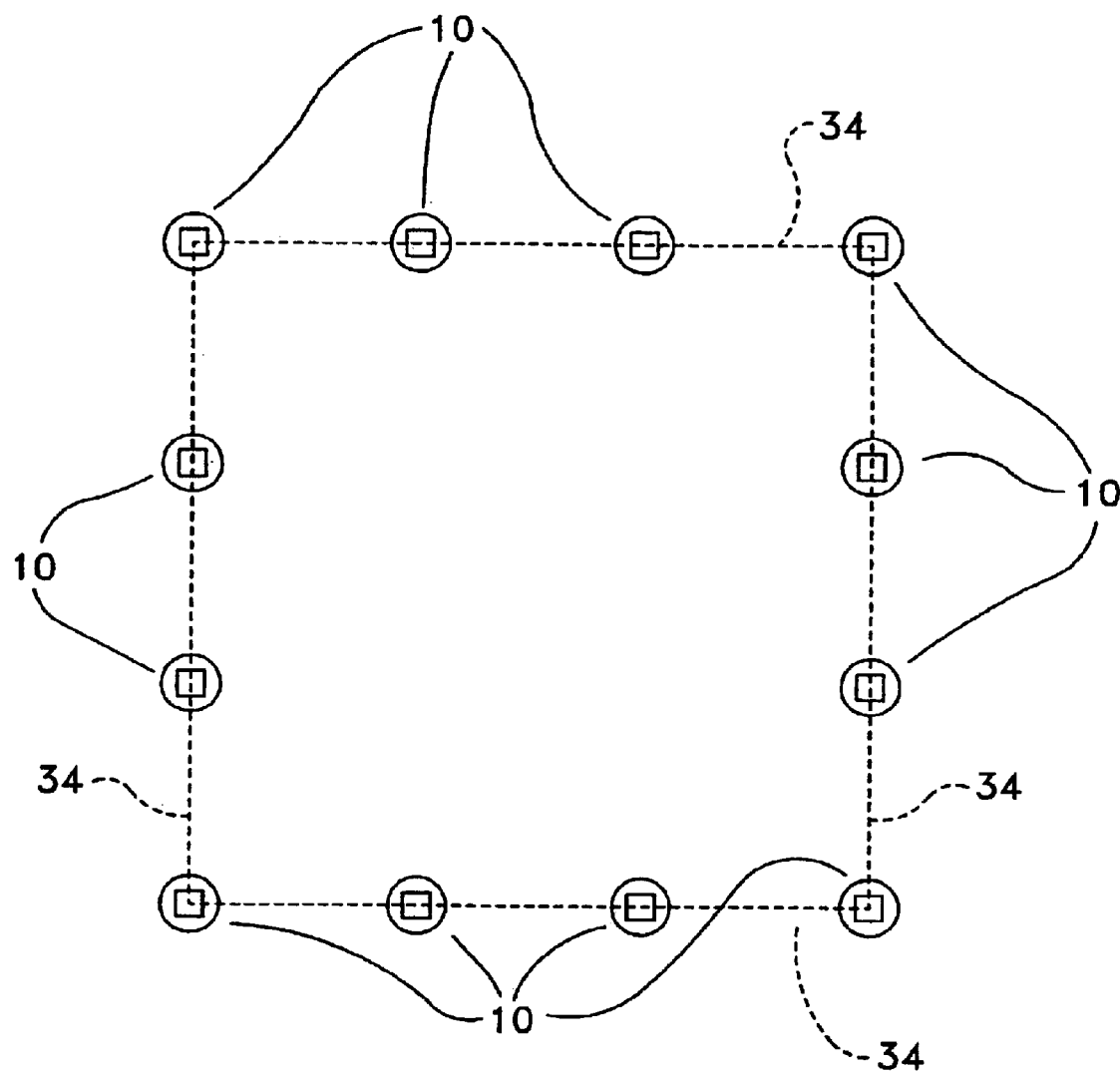
FIG. 4 is a top view of a parcel of land having boundary limits that are marked with the location marker of this invention.

Referring now to FIG. 4, the location marker 10 of this invention can also be used to mark one or more property limits 34, illustrated as dashed lines. For instance, once a parcel of land has been surveyed, a number of stakes or other above ground markers can be used to initially mark off the property. Once the property limits 34 have been initially marked, at least one location marker 10 can be buried along each property limit 34. For this application, the location marker 10 could be positioned in the ground in the PVC plug 17, or alternatively it could be contained within another suitable housing 16. Since the markers 10 are positioned underground, there is no danger that they will be relocated or removed while work is being performed on the property. In addition, since the magnet component 27 of the pot magnet 24 retains its magnetic force indefinitely, the location markers 10 can remain in place and be used to detect the property limits 34 at any time in the future.

It should be appreciated that the foregoing description is for the purposes of illustration only, and alternative embodiments of this invention are possible without departing from the scope of the claims. For instance, while the location marker 10 of this invention has been illustrated as being housed in a PVC plug 17, it should be appreciated that any suitable housing 16 could be substituted. In addition, while the pot magnet 24 has been illustrated as a circular pot magnet, a pot magnet having any suitable shape could be utilized.

Thus, although particular preferred embodiments of the present invention have been disclosed in detail for illustrative purposes, it will be recognized that variations or modifications lie within the scope of the present invention and do not depart from the spirit of the invention, as set forth in the foregoing description and drawings, and in the following claims.

What is claimed is:

1. A location marker, comprising:

a marker housing having a plate-like body, a hollow protuberance projecting from one side of said plate-like body, the interior of said protuberance being closed at a first end by a first end wall, a second end wall being configured to close said hollow interior at a second end thereof, said hollow interior between said first and second end walls and interior walls of said hollow interior defining a magnet holding cavity;

a pot magnet oriented in said magnet holding cavity, a side of said pot magnet facing said first end wall being configured as a magnetic pole surface;

wherein the distance between said first and second end walls is less than a dimension of said pot magnet that is parallel to said magnetic pole surface;

wherein said plate-like body includes an annular skirt protecting from a side thereof remote from said protuberance; and wherein said plate-like body, said protuberance, said first end wall and said annular skirt are of a unitary construction, said second wall having a peripheral shape and dimension conforming to a peripheral shape and dimension of said hollow interior and is configured to be adhesively secured to said plate-like body.

2. The location marker according to claim 1, wherein said protuberance has a square profile when viewed in a direction generally perpendicular to a plane containing said plate-like body.

3. The location marker according to claim 1, wherein an exterior surface of said skirt has a threaded configuration thereon.

* * * * *

UNITED STATES PATENT AND TRADEMARK OFFICE
CERTIFICATE OF CORRECTION

PATENT NO. : 6,807,987 B2 Page 1 of 1
DATED : October 26, 2004
INVENTOR(S) : Steven D. Hill et al.

It is certified that error appears in the above-identified patent and that said Letters Patent is hereby corrected as shown below:

Column 4,
Line 27, change "protecting from" to -- projecting from --.

Signed and Sealed this

Twenty-fourth Day of May, 2005

JON W. DUDAS
*Director of the United States Patent and Trademark Office*